(12) United States Patent  (10) Patent No.: US 8,825,070 B2
Akhtar et al.  (45) Date of Patent: Sep. 2, 2014

(54) RADIO RESOURCE RESERVATION FOR WIRELESS NETWORKS

(75) Inventors: Haseeb Akhtar, Garland, TX (US); Krishnakumar Pillai, Lock Haven, PA (US)

(73) Assignee: Apple Inc., Cupertino, CA (US)

( * ) Notice: Subject to any disclaimer, the term of this patent is extended or adjusted under 35 U.S.C. 154(b) by 1409 days.

(21) Appl. No.: 12/084,270

(22) PCT Filed: May 24, 2007

(86) PCT No.: PCT/US2007/012315
§ 371 (c)(1),
(2), (4) Date: Apr. 3, 2009

(87) PCT Pub. No.: WO2007/139841
PCT Pub. Date: Dec. 6, 2007

(65) Prior Publication Data
US 2009/0185527 A1  Jul. 23, 2009

Related U.S. Application Data

(60) Provisional application No. 60/808,233, filed on May 24, 2006.

(51) Int. Cl.
*H04W 72/00* (2009.01)
*H04W 28/12* (2009.01)
*H04W 74/06* (2009.01)

(52) U.S. Cl.
CPC ............. *H04W 28/12* (2013.01); *H04W 74/06* (2013.01)
USPC ........................................ 455/452.2

(58) Field of Classification Search
USPC .............. 455/452.2, 452.1, 509, 435.1
See application file for complete search history.

(56) References Cited

U.S. PATENT DOCUMENTS

| 7,720,021 | B1* | 5/2010 | Zhou et al. ............... 370/315 |
| 2002/0099854 | A1 | 7/2002 | Jorgensen |
| 2002/0160812 | A1* | 10/2002 | Moshiri-Tafreshi et al. . 455/561 |
| 2004/0042410 | A1* | 3/2004 | Harris et al. ............. 370/252 |
| 2005/0014509 | A1* | 1/2005 | Semper et al. ............ 455/452.2 |
| 2005/0043035 | A1 | 2/2005 | Diesen et al. |
| 2007/0025295 | A1* | 2/2007 | Kono ........................ 370/331 |

OTHER PUBLICATIONS

International Search Authority: Notification of Transmittal of International Search Report, Written Opinion of Int'l Searching Authority, or the Declaration dated Jan. 7, 2008.
International Searching Authority: International Search Report dated Jan. 7, 2008.
International Searching Authority: Written Opinion of the International Searching Authority dated Jan. 7, 2008.

\* cited by examiner

*Primary Examiner* — Kwasi Karikari
(74) *Attorney, Agent, or Firm* — Meyertons, Hood, Kivlin, Kowert & Goetzel, P.C.

(57) ABSTRACT

The present invention supports a communication protocol on a wireless communication network to allocate network resources. The radio network controller maintains quality of service (QoS) profiles. A serving node determines the type of application in a communication call and determines a QoS policy it transmits to the radio network. The radio network identifies the QoS profile based on the received policy and allocates network resources before announcing the call to an access terminal.

30 Claims, 4 Drawing Sheets

RADIO RESOURCE RESERVATION FOR WIRELESS NETWORKS

RELATED APPLICATION DATA

This application is related to U.S. Provisional Patent Application Ser. No. 60/808,233 filed on May 24, 2006, and priority is claimed for this earlier filing under 35 U.S.C. §120. The Provisional Patent Application is also incorporated by reference into this utility patent application.

TECHNICAL FIELD OF THE INVENTION

A method for reserving resources on a wireless communication network to decrease call setup time.

BACKGROUND OF THE INVENTION

The Internet, like so many other high tech developments, grew from research originally performed by the United States Department of Defense. In the 1960s, the military had accumulated a large collection of incompatible computer networks. Computers on these different networks could not communicate with other computers across their network boundaries.

In the 1960s, the Defense Department wanted to develop a communication system that would permit communication between these different computer networks. Recognizing that a single, centralized communication system would be vulnerable to attacks or sabotage, the Defense Department required that the communication system be decentralized with no critical services concentrated in vulnerable failure points. In order to achieve this goal, the Defense Department established a decentralized standard communication protocol for communication between their computer networks.

A few years later, the National Science Foundation (NSF) wanted to facilitate communication between incompatible network computers at various research institutions across the country. The NSF adopted the Defense Department's protocol for communication, and this combination of research computer networks would eventually evolve into the Internet.

Internet Protocols

The Defense Department's communication protocol governing data transmission between different networks was called the Internet Protocol (IP) standard. The IP standard has been widely adopted for the transmission of discrete information packets across network boundaries. In fact, the IP standard is the standard protocol governing communications between computers and networks on the Internet.

The IP standard identifies the types of services to be provided to users and specifies the mechanisms needed to support these services. The IP standard also specifies the upper and lower system interfaces, defines the services to be provided on these interfaces, and outlines the execution environment for services needed in the system.

In a typical Internet-based communication scenario, data is transmitted from an originating communication device on a first network across a transmission medium to a destination communication device on a second network. After receipt at the second network, the packet is routed through the network to a destination communication device using standard addressing and routing protocols. Because of the standard protocols in Internet communications, the IP protocol on the destination communication device decodes the transmitted information into the original information transmitted by the originating device.

The IP-Based Mobility System

The Internet protocols were originally developed with an assumption that Internet users would be connected to a single, fixed network. With the advent of cellular wireless communication systems using mobile communication devices, the movement of Internet users within a network and across network boundaries has become common. Because of this highly mobile Internet usage, the implicit design assumption of the Internet protocols (e.g. a fixed user location) is violated by the mobility of the user.

In an IP-based mobile communication system, the mobile communication device (e.g. cellular phone, pager, computer, etc.) can be called a mobile node or mobile station. Typically, a mobile station maintains connectivity to its home network while operating on a visited network. The mobile station will always be associated with its home network for IP addressing purposes and will have information routed to it by routers located on the home and visited networks.

Packet-Based Communication Systems

In Internet Protocol (IP) networks, the communication process is very different from prior conventional telecommunication systems. In an IP network communication, there is no open switched connection established between the caller and recipient devices. The information being transmitted between the caller and recipient devices is broken into packets of data, and each packet of data is transmitted to the recipient device in pieces. The data packets individually contain routing information to direct each packet to the recipient device. These packets are then reassembled into a coherent stream of data at the recipient device.

Code Division Multiple Access (CDMA) is an evolving third generation communication system standard for wireless communication systems that can transmit multimedia services using the packet-based Internet protocol. These CDMA mobile communication systems support multimedia telecommunication services delivering voice such as VoIP (Voice over IP) and data, to include pictures, video communications, and other multimedia information over mobile wireless connections. These types of communications are typically time-sensitive and require high data rate transfers with inherent delays minimized as much as possible.

As the capability of the various communication standards have improved, there has been an increasing need for high-speed transmissions and increased user capacity. A new CDMA packet air interface has been developed that offers improvements over earlier CDMA systems by implementing high-speed shared-traffic packet data channels on the forward air-link connection. Recent developments include CDMA-based 1xEV systems operating at 1.25 MHz. The 1.25 MHz carrier delivers high data rates and increased voice capacity. 1xEV is a two-phase strategy. One phase is designated 1xEV-DO, which handles data only. The 1xEV-DO standard provides user with peak data rates of 3.0 Mbits/s. The other phase is 1xEV-DV, for data and voice. Other standards are evolving that also make use of the shared packet channel and multiplex packet communication for high-speed data and voice communication.

In the CDMA standard, Mobile Nodes, or Access Terminals (AT), roam within and across cellular communication sites. Each of the sites, or cells, possesses one or more transceivers coupled to a Base Transceiver Station (BTS) onto the communication network. The BTSs are in turn coupled to an Access Network (AN), also known as a Radio Network (RN). As an AT travels across cellular borders, its physical connection to the BTS keeps on changing. An AT can be physically located anywhere on the network or sub-network, and its routing address data will change and require updating on other nodes. Wireless IP networks handle the mobile nature of AT with hand-off procedures designed to update the communication network and sub-network with the location of the mobile node for packet routing purposes. The latency period in these hand-offs can be prohibitively high. Call (or packet data session) setup times can also be excessive as communication pathways across the access network (whether wireline or wireless) are established before transmitting session specific data (e.g., a SIP Invite message) needed to establish a delay sensitive application—such as VoIP, PTT (Push To Talk) and VT (Video Telephony) etc.—session.

A new method of call (or packet data session) signaling (for example, SIP signaling) to setup a real-time application session (such as a VoIP, PTT or VT session) in 1xEV-DO can significantly reduce the call setup time. Call (or packet data session) setup time is an important performance indicator for applications like Push-to-Talk (PTT), Voice over IP (VoIP), and Video Telephony (VT). Call (or packet data session) setup is a critical aspect of delay sensitive application (such as VoIP, PTT, and VT etc.) functionality, since call (or packet data session) setup delays can negate the value of the function. Long pauses in walkie-talkie (or voice call) performance adversely impact the versatility to using the function and lead to customer dissatisfaction. Service providers are quite aware of this concern and are insistent that implementing infrastructure minimizes call (or packet data session) setup delays.

Applications using wireless technology for data delivery have to explicitly reserve network resources before data can be exchanged to meet unique resource requirements for the content being transmitted. Resource reservation has to be done by the originating and terminating parties for satisfactory communication since various media content have specific requirements in terms of delay and jitter tolerance. The content can be classified as delay sensitive, rate sensitive, time sensitive, or some other quality adversely impacting the communication. The method for reserving and allocating network resources can significantly effect call (or packet data session) setup time. The extra messaging involved in setting up resources prior to initiating media flow increases call (or packet data session) setup times that often fall outside the limits of tolerance.

In the invention, the RNC learns the nature of the content from the requests reserved by the originator of media, and sets aside resources a priori for the terminating end without waiting for a request (from the terminating AT). This earlier reservation or allocation of resources at the terminating end without a request provides immense savings in call (or packet data session) setup times, which is critical for successful deployment of essential services such as PTT, VoIP, and VT, etc. Since resource availability is known during the early stages of call (or a packet data session) setup, the certainty of the stability of established calls (or packet data sessions) can be assured with a higher degree of success.

Prior art approaches have not been successful. An optimistic approach to call (or packet data session) setup has been proposed as a predictive scheme. This method involves the delivery of a call (or packet data session) announcement as a general broadcast along with an indication that resources have been allocated beforehand. This allotment is made without a localized view of resource availability or knowledge of which paging sector the AT may respond on. Once the location of the AT is known through its response, subsequent resource allocation attempts by the network on a specific channel within the location sector may fail, causing the call (or packet data session) attempt to abort. Furthermore, this predictive approach is not scalable because it can only be used over a limited number of paging sectors and requires the RN to become content aware. The range limitation of paging sectors covered decreases the first page success rate, destroying the benefits of predictive resource allocation. Content awareness is also computing resource intensive and may adversely impact performance indicators across all applications. There is a need for a new method of resource allocation that reduces latency and speeds up call (or packet data session) setup in time sensitive applications such as PTT, VoIP, and VT, which have stringent constraints on call (or packet data session) set up delays.

SUMMARY OF THE INVENTION

Upon receiving call setup signaling and resource reservation requests from the originating user, the Radio Network Controller (RNC) linked to the Radio Network (RN) has enough information to identify a Quality of Service (QoS) profile, which is used to deliver content and signaling for that specific application (such as VoIP, PTT, and VT etc.) session. The RNC maintains an abstract data type that associates a call-in-progress with a QoS profile as soon as call processing begins. A serving node (such as PDSN in 3GPP2 network) on the system determines the application based on attributes in the packet and transmits a QoS indicator value (associated with its QoS profile) to the RNC. The RNC retrieves a QoS profile based on the QoS indicator value present in the packet. After the terminating AT entity has been paged (i.e., located in a specific RN sector), the RNC reserves resources for completing the call before announcing the call to the AT based on the generated QoS profile. Setup time is considerably reduced by avoiding the resource request/grant handshaking at the terminating AT side.

This method described improves performance indicators such as call setup latency. Certain applications such as PTT, VoIP and VT have stringent constraints on call set up delays and this approach allows the network to guarantee call setup within a very narrow time constraint. Prior art approaches grant connectivity optimistically to reduce setup times. This approach guarantees the connection and at the same time minimizes messaging to complete call setup much quicker than conventional optimistic approaches.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
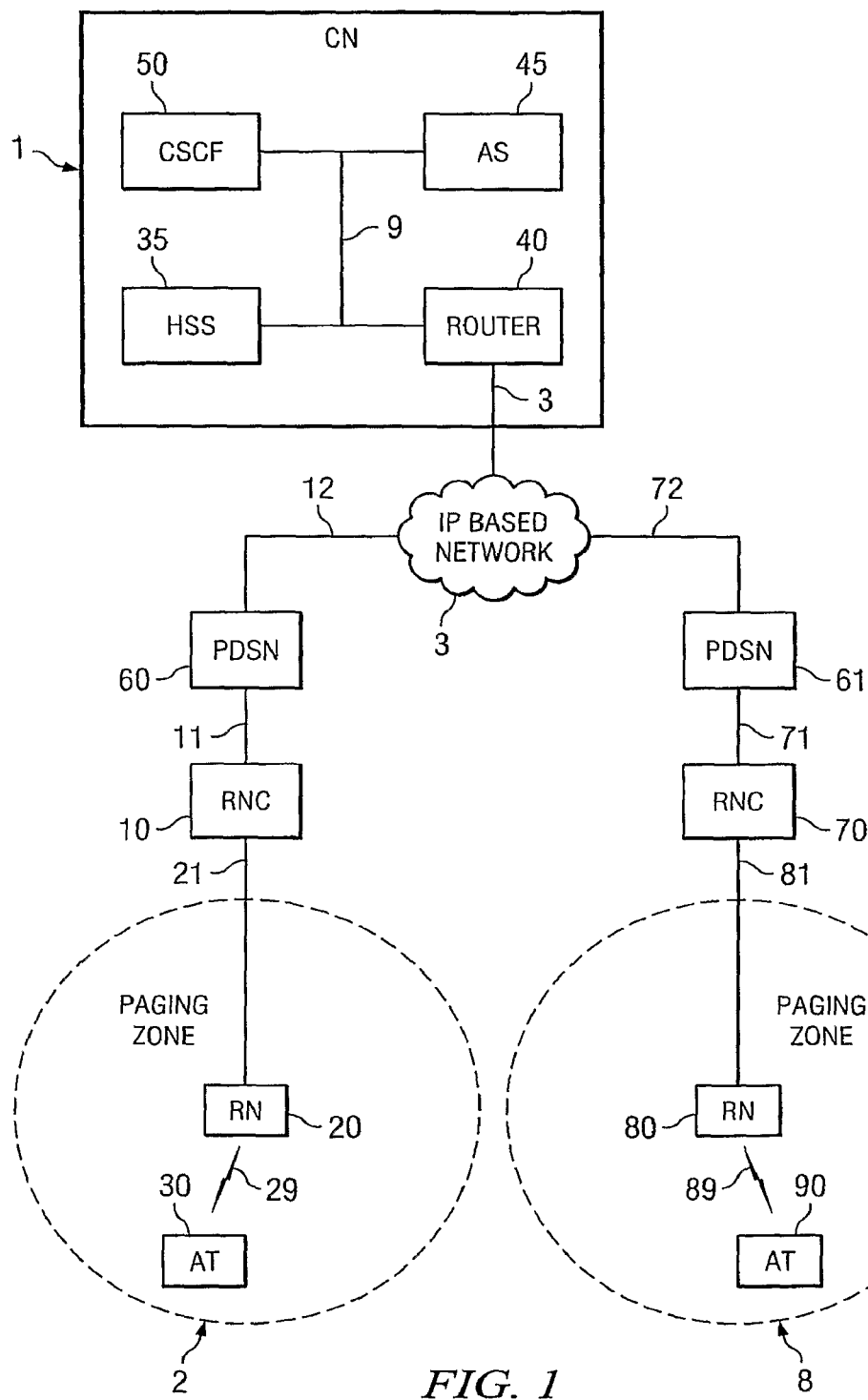
FIG. 1 is a schematic diagram of the functional elements of a wireless communication network compatible with the invention based on an implementing architecture for a CDMA system.

FIG. 1 shows a CDMA wireless telecommunications system compatible with the invention. The IP based network 3 is coupled to a PDSN 60 via communication link 12 and to another PDSN 61 via communication link 72. The PDSN 60 and PDSN 61 are also connected to RNC 10 and RNC 70 via communication links 11 and 71, respectively. The RNC 10 is in turn coupled to a Radio Network (RN) 20, supporting wireless communications within a paging zone 2, via communication line 21. The RN 20 is coupled to an Access Terminal (AT) 30 via wireless communication link 29. The RN 20 supports communication within a cell site configured into one or more paging zones 2. The RNC 70 is in turn coupled to a Radio Network (RN) 80, supporting wireless communications within a paging zone 8, via communication line 81. The RN 80 is coupled to an Access Terminal (AT) 90 via wireless communication link 89. The RN 80 supports communication within a cell site configured into one or more paging zones 8.

The CN 1 consists of a Home Subscriber Server (HSS) 35 coupled to the Call Session Control Function (CSCF) 50 and Application Server (AS) 45 connected to each other via a bus line 9. The bus line 9 is also connected to a router 40. Both the bus 9 and the router 40 are part of communication network that may use protocols such as ATM, MPLS, IP, Ethernet etc. The router 40 is connected to the IP based network 3 via the communication link 4. The AS 40 may either be a VoIP server, or a PTT server, or a VT server or a combination thereof.

The data transmission between the PDSN 60 and RNC 10 flows through communication link 12, thereby permitting communication between the RN 20 and the PDSN 60. The data transmission between PDSN 61 and RNC 70 flows through communication link 71, thereby permitting communication between the RN 80 and the PDSN 61. Data transmission between the CN 1 and PDSN 60 flows through the communication links 4 and 12 via the IP based network 3. Similarly, data transmission between the CN 1 and PDSN 61 flows through the communication links 4 and 72 via the IP based network 3. The RNC 10 communicates the session specific QoS requirements to RN 20 and instructs it to allocate necessary RF (Radio Frequency) resources to support wireless communications to the AT 30. The RNC 70 communicates the session specific QoS requirements to RN 80 and instructs it to allocate necessary RF resources to support wireless communications to the AT 90.

The invention is aimed toward reserving resources to support communications between the AT 30 and the CN 1 broadly and the IP based network 3 specifically. This communication can also take place between the AT 30 and AT 90 via the CN 1 and/or the IP based network 3. The first step is to identify the application (such as VoIP, PTT, and VT etc.) associated with the transmitted data. The PDSN 60 identifies the application (such as VoIP, PTT, and VT etc.) based on various characteristics of the incoming data packets. These include the source IP address, the destination IP address, the IP flow identification, the Differentiated Services Code Point (DSCP) values in the packet header (which specifies a per-hop behavior applied to the packet), source port number, destination port number, and other packet/policy attributes. The packet/policy attributes are configured in the PDSN 60 by the operators based on the unique packet filtering criteria associated with each application (such as VoIP, PTT, and VT etc.). The PDSN 60 is configured with a policy value to identify the application (such as VoIP, PTT, and VT etc.) associated with an incoming IP packet that is destined toward the AT 30. The PDSN 60 inserts the policy value into the Generic Routing Encapsulation (GRE) header and/or on the DSCP value of the IP header associated with the application (identified earlier based on the packet/policy attributes). This policy value will specify the QoS resource requirements for the specific IP packet. Although in the preferred embodiment, the PDSN 60 performs these functions, they could be performed by the AS 45, CSCF 50, router 40, a gateway, or another server node in the CN 1.

The second part is to allocate QoS resources. Upon receiving call (or packet data session) setup signaling and resource reservation requests from the originating user, the RNC 10 has enough information to generate a QoS profile required to deliver content and signaling for this specific application (such VoIP, PTT, and VT etc.) session. Based on the QoS requirements for the application (such VoIP, PTT, and VT etc.) represented by the inserted policy value, as configured by the operator of the network, the RNC 10 allocates the required QoS resources to set up the application (such as VoIP, PTT and VT etc.) session. The RNC 10 maintains an abstract data type that associates a session-in-progress with the QoS profile associated with the policy value. Once the terminating entity, the AT 30, has been paged and located, the RNC 10 sets up or reserves the required RAN resources for completing the application (such as VoIP, PTT and VT etc.) session before announcing the application (such as VoIP, PTT, and VT etc.) session (e.g., a SIP Invite message) to the terminating side. After the RNC 10 receives a response message (such as the "Connection Request+Route Update" message for the CDMA HRPD wireless technology) from the terminating AT 30, it explicitly reserves resources on the terminating side (e.g. the AT 30) by requesting air-link resources that are based on the QoS profile requested by the originating side (e.g. the AT 90, the CN 1 etc.). Call (or a packet data session) setup time is considerably reduced by avoiding the resource request/grant handshaking at the terminating side. Lack of resource availability can be translated into aborting the call sooner without degrading network utilization.

Figure 2A:
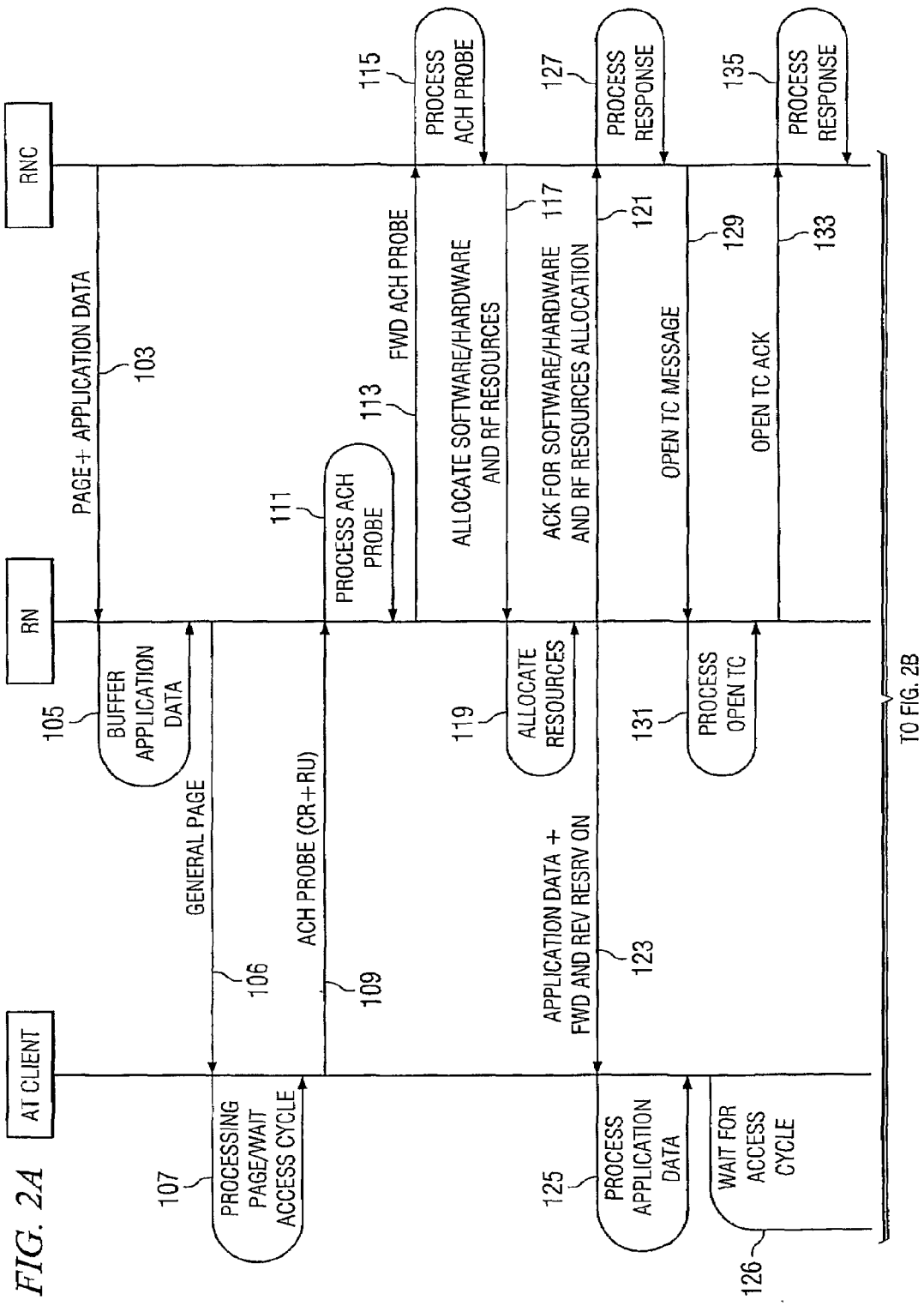
FIG. 2 is a message flow diagram implementing the invention on the CDMA architecture.
Figure 2B:
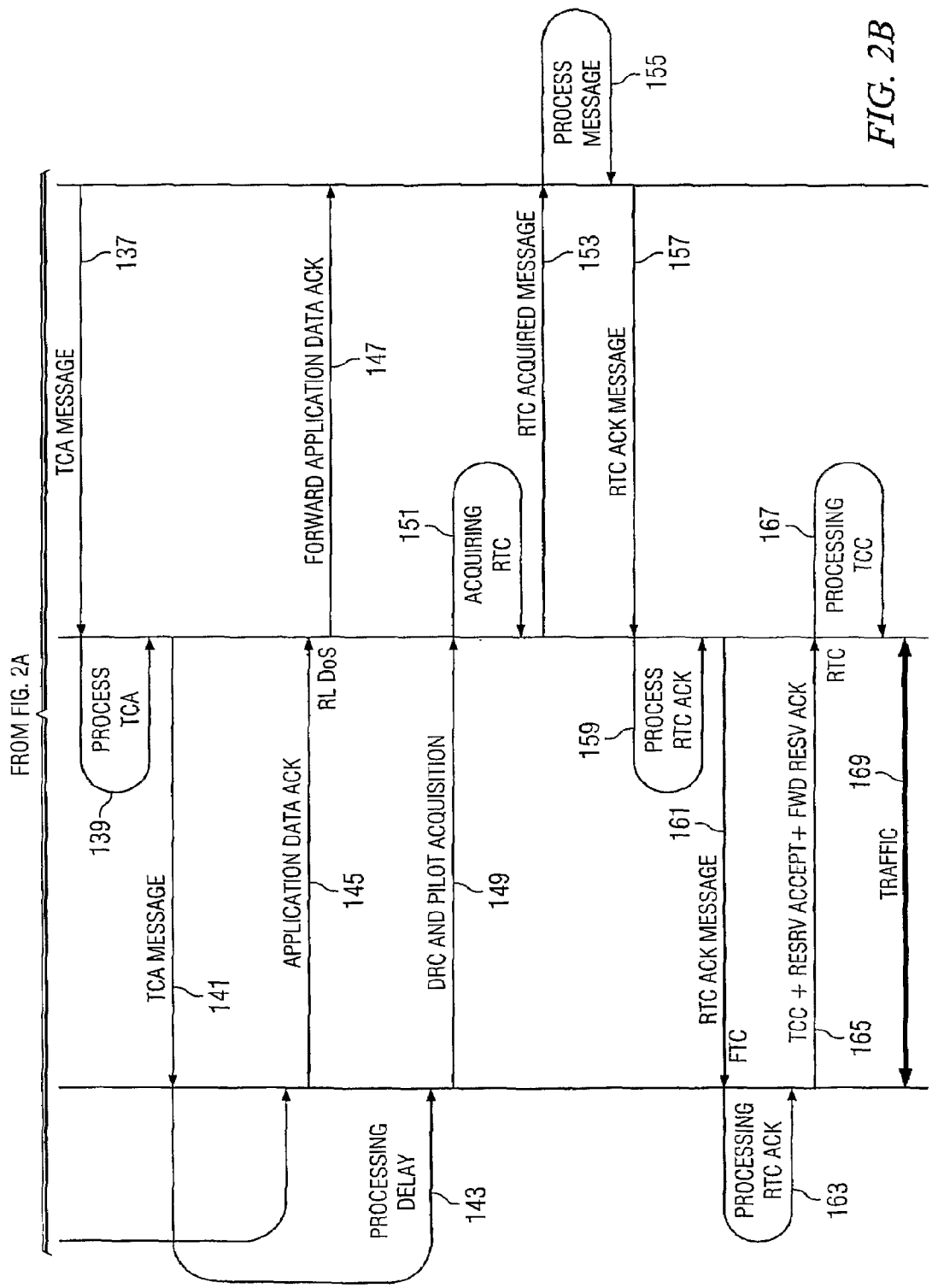

FIG. 2 shows a message flow implementing the invention. Referencing the CDMA network of FIG. 1, in step 103, the RNC transmits a page message and application (such as VoIP, PTT and VT etc.) session specific data to the RN. At this point, the RNC has the QoS profile requested by the originating side and forwards the QoS profile to the RN. In step 105, the application (such as VoIP, PTT and VT etc.) session specific data is buffered, and the page message is forwarded to the AT in step 106. The AT processes the page and waits for the access cycle to complete in step 107. In step 109, an Access Channel (ACH) probe request is sent by the AT containing both a Connection Request (CR) packet and a Route Update (RU) message packet. In step 111, the RN processes the ACH probe, and forwards the ACH probe to the RNC, which processes the probe at step 15. The RNC makes appropriate RAN resource reservations based on the QoS profile once the AT responds. In step 117, the RNC requests the RN for the required software/hardware and RF resources (such as scheduler queues within the RN's computing entities, MAC indices etc.). The RN allocates the requested software/hardware and RF resources in step 119. If the network resources are not available at this point, only application (such as VoIP, PTT and VT etc.) session specific data (e.g., a SIP Invite) is forwarded to the AT without allocating the required QoS specific RAN resources. The AT then explicitly requests resources as in the general case. In step 121, the RN informs the RNC that all of the requested software/hardware and RF resources have been secured by sending an ACK (e.g. an ACK for software/hardware and RF resources allocation) message. The RN, at the same time, transmits the application (such as VoIP, PTT and VT etc.) session specific data (e.g., a SIP Invite) data and a RAN QoS resource allocation confirmation (e.g. the Forward and Reverse ReservationOn message in CDMA HRPD technology) message to the AT in step 123. The RAN QoS resource allocation confirmation (e.g. the Forward and Reverse ReservationOn message) message packet indicates that the RNC has allocated the necessary RAN resources required to provide the desired QoS for this application (such as VoIP, PTT and VT etc.) session on both the originating and terminating sides. In step 125, the AT processes the application data, and in step 126, the AT waits for the access cycle to be completed.

In step 127, the RNC processes the ACK (e.g., an ACK for software/hardware and RF resources allocation) message received from the RN in step 121. The RNC then requests the RN to open a traffic channel by sending a traffic channel initiation (e.g. an OpenTC) message at step 129. In step 131, the RN processes the traffic channel initiation (e.g. an OpenTC) message and transmits an acknowledgement message (e.g., an OpenTCACK) to the RNC in step 133. The RNC processes this response in step 135. In step 137, the RNC instructs the RN to assign a traffic channel to the AT by sending the appropriate channel assignment (e.g., a traffic channel assignment or TCA) message, and this message (e.g., a TCA) is processed by the RN in step 139. The traffic channel is assigned by forwarding a traffic channel assignment message (e.g., a TCA) to the AT in step 141.

In step 145, the AT completes the access cycle and transmits an acknowledgement to the application (such as VoIP, PTT and VT etc.) session specific message (e.g. a SIP 200 OK) to the RN. The message specified in step 145 can be transmitted over the signaling resources of the RAN (e.g., a reverse DoS in CDMA HRPD technology). While the application (such as VoIP, PTT and VT etc.) session specific message is shown (in FIG. 2) to be sent by the AT after receiving the traffic channel assignment message (e.g., a TCA), that, however, does not preclude the AT from sending this message at any time between steps 123 and 141. The RN forwards the application (such as VoIP, PTT and VT etc.) session specific message to the RNC in step 147. In step 143, the AT completes processing the traffic channel assignment message (e.g. a TCA). The AT then transmits a Data Rate Control (DRC) message and a Pilot Acquisition message in step 149. The pilot signal in a wireless network is typically used for the forward link synchronization, coherent detection, soft handoff and for maintaining orthogonality of the AT.

In step 151, the RN acquires a Reverse Traffic Channel (RTC) and transmits the RTC information in a RTC Acquired message to the RNC in step 153. In step 155, the RNC processes the RTC acquisition message and transmits an acknowledgment (e.g. an RTC ACK) message to the RN in step 159. In step 161, the RN transmits a RTC Acknowledge (e.g., a RTC ACK) to the AT over the Forward Traffic Channel (FTC). In step 163, the AT processes the RTC acknowledgement (e.g. an RTC ACK) message, and in step 165 transmits a Traffic Channel Complete (TCC) message, a Reservation Accept (ReservationAccept) message, and a Forward Reservation Acknowledgement (FwdReservationAck) message to the RN over the RTC. The RN processes these messages in step 167. The AT and the RN begin communicating traffic data packets in step 169.

Figure 3:
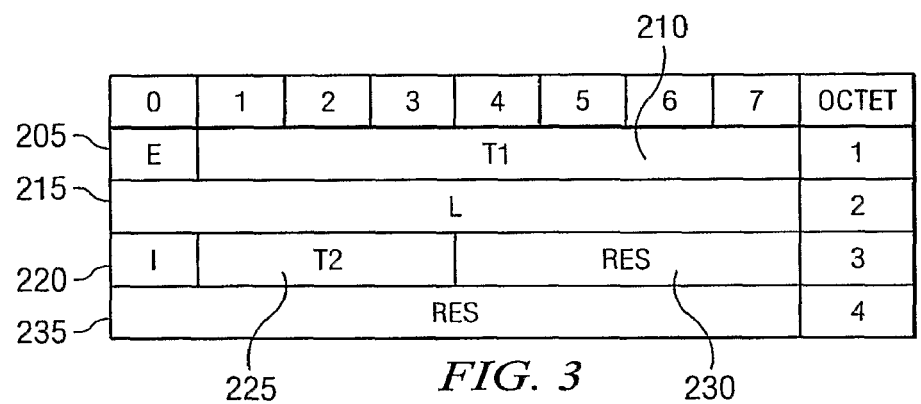
FIG. 3 shows details of a modified message used by the invention.

FIG. 3 shows a modified packet data field used by the PDSN in the invention. If a data packet requires reserving resources, the 1×SDB/HRDP Data over Signaling (DoS) Indicator field in the HRPD Interoperability Specification (IOS) standard (e.g. 3GPP2 A.S0008-A or TIA-878-A) is modified to include both urgent and non-urgent packets. The PDSN tags the GRE header in the packet for 'urgent' or 'non-urgent' 1×SDB or HRPD DoS transmission as shown in FIG. 3 based on the DSCP value and/or based on another packet filtering mechanism as Traffic Flow Template (TFT) as described by (but not limited to) IS-835 D.

The Ethertype (E) value 205 in the GRE header should be set for Unicast ("0") or Multicast ("1") (E=0,1). The Type (T1) data field 210 has a value of "000 0001" and designates the packet as a Short Data Indication packet. The Length (L) data field (215) has a value of 02H. The Indicator (I) data field 220 has a value of "1" indicating the packet as suitable for 1×SDB or HRPD DoS transmission. The value "0" (zero) for the data field 220 has been reserved for future use. The SDI/DoS type data field (T2) 225 is assigned a value tagging the packet as 'urgent' ("1") or 'non-urgent' ("0") as well as the policy value indicating the application (such as VoIP, PTT, and VT etc.) and the desired QoS treatment. The policy values for the data field (T2) 225 are as follows.

0—Non-urgent packet suitable for 1×SDB or HRPD DoS Transmission

1—Urgent packet suitable for 1×SDB or HRPD DoS Transmission

2—Allocate QoS resources for forward link (from RAN to AT) only

3—Delay Sensitive application with low end-to-end delay bound

4—Delay Sensitive application with moderate end-to-end delay bound

5—Rate Sensitive application with low bandwidth requirement

6—Rate Sensitive application with high bandwidth requirement

7—Broadcast based application

The data fields 230 and 235 are reserved (RES).

While the invention has been particularly shown and described with respect to preferred embodiments, it will be readily understood that minor changes in the details of the invention may be made without departing from the spirit of the invention.

Having described the invention, we claim:

1. A packet-based wireless communication system, comprising:
    a serving node on the system identifying the application of a communication call based on packet characteristics;
    a radio network controller coupled to the serving node and controlling a radio network possessing at least one base transceiver station configured into at least one paging zone; and
    said serving node communicating the application as a policy value designating a quality of service behavior type to the radio network controller, said radio network controller allocating required network resources, based on the policy value, before announcing the call to a coupled access terminal, wherein said allocating excludes the radio network controller performing a handshaking routing with the access terminal.

2. The packet-based wireless communication system of claim 1, further comprising:
    the radio network broadcasting a page message to the access terminal; and
    upon receipt of a response to said page message, the radio network controller allocates network resources.

3. The packet-based wireless communication system of claim 2, further comprising:
    the response to the page includes a connection request message.

4. The packet-based wireless communication system of claim 2, further comprising:
    the response to the page includes a route update message.

5. The packet-based wireless communication system of claim 1, further comprising:
    the radio network controller storing at least one data attribute associated with a quality of service profile, said profile associated with the policy value.

6. The packet-based wireless communication system of claim 1, further comprising:
the radio network controller creating a quality of service profile based on the policy value.

7. The packet-based wireless communication system of claim 1, further comprising:
the serving node assigning the policy value based on at least one of a source address, a destination address, the flow identification, a code value in a quality of service configuration, a source port number, or a destination port number.

8. A radio network in a packet-based wireless communication system, comprising:
a radio network controller coupled to a serving node and controlling a radio network possessing at least one base transceiver station configured into at least one paging zone;
the radio network controller receiving a quality of service policy value from a serving node on the system, the policy value used by the radio network controller to create a quality of service profile and, based on the profile, allocate the network resources required to support the quality of service upon receipt of a response to a page to a coupled access terminal, wherein allocating the network resources excludes performing handshaking with the access terminal.

9. The radio network in a packet-based wireless communication system of claim 8, wherein the policy type corresponds to a quality of service behavior type.

10. The radio network in a packet-based wireless communication system of claim 8, further comprising:
the response to the page includes a connection request message.

11. The radio network in a packet-based wireless communication system of claim 8, further comprising:
the radio network controller maintaining a data attribute associated with the quality of service profile, said profile corresponding to the quality of service policy value and associated with the resources required to deliver content and signaling of the communication call.

12. The radio network in a packet-based wireless communication system of claim 8, further comprising:
the policy value assigned based on at least one of a source address, a destination address, a flow identification, a code value in a quality of service configuration, a source port number, or a destination port number.

13. A method for allocating network resources on a packet-based wireless system, comprising the steps of:
identifying the application of a communication call based on packet characteristics and assigning a behavior type value;
receiving at a radio network controller coupled to a radio network the behavior type value, and said radio network controller associating the behavior type value with a quality of service required to deliver content and signaling of the communication call;
assigning network resources based on a quality of service profile generated by the radio network controller and associated with said quality of service, said resources allocated after receiving a response to a page transmitted to an access terminal and before announcing the call to the access terminal, wherein said assigning network resources excludes performing a handshake routine with the access terminal; and
generating the quality of service profile based on the behavior type value.

14. The method for allocating network resources on a packet-based wireless system of claim 13, further comprising the steps of:
broadcasting the page from a radio network coupled to the radio network controller to a wirelessly linked access terminal; and
receiving a page response at the radio network prior to resource allocation.

15. The method for allocating network resources on a packet-based wireless system of claim 13, further comprising the step of:
storing a data attribute associated with one quality of service profile on the radio network controller, said data attribute associated with a transmitted behavior type value.

16. The method for allocating network resources on a packet-based wireless system of claim 13, further comprising the step of:
allocating network resources using the radio network controller.

17. The method for allocating network resources on a packet-based wireless system of claim 13, further comprising the step of:
allocating network resources using the access terminal.

18. The method for allocating network resources on a packet-based wireless system of claim 13, further comprising the step of:
identifying the application based on at least one of a source address, a destination address, a flow identification, a code value in a quality of service configuration, a source port number, or a destination port number.

19. The method for allocating network resources on a packet-based wireless system of claim 13, wherein the behavior type is assigned based on at least one of a source address, a destination address, a flow identification, a code value in a quality of service configuration, a source port number, or a destination port number.

20. The method for allocating network resources on a packet-based wireless system of claim 19, wherein the serving node is selected from a group that includes a packet data serving node, a home subscriber server node, a call session control function, an application server, or a gateway node.

21. A system comprising:
a serving node, wherein the serving node is configured to identify an application associated with a communication call based on packet characteristics, and wherein the system is a packet-based wireless communication system; and
a radio network controller coupled to the serving node, wherein the radio network controller is configured to control a radio network having at least one base transceiver station associated at least one paging zone;
wherein the serving node is configured to, based on the application, communicate a policy value designating a quality of service behavior type to the radio network controller, and wherein the radio network controller is configured to, using a quality of service profile based on the quality of service behavior type, allocate required network resources prior to announcing the call to a coupled access terminal, wherein allocating the required network resources excludes performing a handshaking routing to the coupled access terminal.

22. The system as recited in claim 21, wherein the access terminal is a mobile communications device.

23. The system as recited in claim 21, wherein the serving node is coupled to an internet protocol (IP) network.

24. The system as recited in claim 21, wherein the serving node is configured to identify a voice over internet protocol (VoIP) application based on packet characteristics.

25. The system as recited in claim 21, wherein the serving node is configured to identify a push to talk (VTT) application based on packet characteristics.

26. The system as recited in claim 21, wherein the serving node is configured to identify a video telephony (VT) application based on packet characteristics.

27. A method comprising:
identifying, based on characteristics of received packets, an application associated with a communication call, wherein said identifying is performed by a serving node;
communicating, based on the application, information indicative of a quality of service behavior type to a radio network controller;
allocating, based on the quality of service behavior type, required network resources for the call prior to announcing the call to a terminating mobile device, wherein said allocating is performed by the radio network controller, and wherein said allocating excludes performing a handshake routine with the terminating mobile device.

28. The method as recited in claim 27, further comprising:
the serving node receiving packets from an internet protocol (IP) network;
the serving node identifying the application based on characteristics of the packets received from the IP network.

29. The method as recited in claim 27, further comprising the serving node identifying the application as a voice over internet protocol (VoIP) application based on packet characteristics.

30. The method as recited in claim 27, further comprising the serving node identifying the application as a video telephony (VT) based on packet characteristics.

* * * * *